United States Patent
Lee et al.

(10) Patent No.: US 12,211,972 B2
(45) Date of Patent: Jan. 28, 2025

(54) POLYMER ELECTROLYTE AND METHOD OF PREPARING SAME

(71) Applicants: HYUNDAI MOTOR COMPANY, Seoul (KR); KIA CORPORATION, Seoul (KR); University of Seoul Industry Cooperation Foundation, Seoul (KR)

(72) Inventors: Ho Taek Lee, Seoul (KR); Yong Min Kim, Seoul (KR); Hong Chul Moon, Seoul (KR)

(73) Assignees: HYUNDAI MOTOR COMPANY, Seoul (KR); KIA CORPORATION, Seoul (KR); UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 771 days.

(21) Appl. No.: 17/365,447

(22) Filed: Jul. 1, 2021

(65) Prior Publication Data

US 2022/0158233 A1    May 19, 2022

(30) Foreign Application Priority Data

Nov. 17, 2020   (KR) .......................... 10-2020-0153296

(51) Int. Cl.
  *H01M 10/0565*  (2010.01)
  *C08F 220/18*  (2006.01)
  (Continued)

(52) U.S. Cl.
  CPC ... *H01M 10/0565* (2013.01); *C08F 220/1804* (2020.02); *C08F 226/06* (2013.01);
  (Continued)

(58) Field of Classification Search
  None
  See application file for complete search history.

(56) References Cited

U.S. PATENT DOCUMENTS 8,926,732 B2 *  1/2015  Bara .................. C08G 73/0616
                                                    96/5
9,166,254 B2   10/2015  Tsai et al.
                (Continued)

FOREIGN PATENT DOCUMENTS

DE          10112613 A1 * 10/2002  ............. H01B 1/122
KR   10-2005-0083533 A     8/2005
                (Continued)

OTHER PUBLICATIONS

Abstract Translation of DE 10-112613 A1 (Year: 2002).*
(Continued)

*Primary Examiner* — Kevin M Bernatz
(74) *Attorney, Agent, or Firm* — Morgan, Lewis & Bockius LLP

(57) ABSTRACT

A polymer electrolyte includes an ionic liquid and a polymer matrix including a copolymer having a first repeating unit represented by Chemical Formula 1 and a second repeating unit represented by Chemical Formula 2 below:

[Chemical Formula 1]

(Continued)

-continued

[Chemical Formula 2]

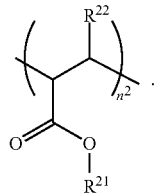

17 Claims, 7 Drawing Sheets

(51) Int. Cl.
 C08F 226/06 (2006.01)
 H01M 10/0525 (2010.01)
(52) U.S. Cl.
 CPC ......... H01M 10/0525 (2013.01); H01M 2300/0082 (2013.01); H01M 2300/0091 (2013.01)

(56) References Cited

U.S. PATENT DOCUMENTS

| | | | |
|---|---|---|---|
| 9,647,293 B2 | 5/2017 | Shan et al. | |
| 11,721,810 B2* | 8/2023 | Shin | H01M 4/64 429/209 |
| 2010/0190947 A1* | 7/2010 | Hood | C08F 226/10 526/264 |
| 2020/0343594 A1* | 10/2020 | Kuo | H01G 11/56 |
| 2021/0147604 A1* | 5/2021 | Daigle | C08F 222/06 |

FOREIGN PATENT DOCUMENTS

| | | |
|---|---|---|
| KR | 10-2019-0088212 A | 7/2019 |
| WO | WO 2014/186980 A | 11/2014 |
| WO | WO 2016/053065 A | 4/2016 |

OTHER PUBLICATIONS

Evans et al., "Oxidation of N, N, N', N'-tetraalkyl-para-phenylenediamines in a series of room temperature ionic liquids incorporating the bis(trifluoromethylsulfonyl)imide anion," J. Electroanal. Chem., 2003, 556, 179-188 (May 1, 2003).

Yim et al., "Synthesis and Properties of Acyclic Ammonium-based Ionic Liquds with Allyl Substituents as Electrolytes," Molecules, 2009, 14, 1840-1851 (May 15, 2009).

Gu et al., "High Toughness, High Conductivity Ion Gels by Sequential Triblock Copolymer Self-Assembly and Chemical Cross-Linking," J. Am. Chem. Soc. 2013, 135, 9652-9655 (Jun. 18, 2013).

Tang et al., "Synergistic Increase in Ionic Conductivity and Modulus of Triblock Copolymer Ion Gels," Macromolecules 2015, 48, 4942-4950 (Jul. 7, 2015).

Chung et al., "Cation-Hydroxide-Water Coadsorption Inhibits the Alkaline Hydrogen Oxidation Reaction," J. Phys. Chem. Lett. 2016, 7, 4464-4469 (Oct. 24, 2016).

Cowan et al., "Imidazolium-Based Poly(ionic liqud)/Ionic Liquid Ion-Gels with High Ionic Conductivity Prepared from a Curable Poly(ionic liquid)," Macromol. Rapid Commun. 2016, 37, 1150-1154 (2016).

Ding et al., "Preparation of High-Performance Ionogels with Excellent Transparency, Good Mechanical Strength, and High Conductivity," Adv. Mater. 2017, 29, 1704253 (2017).

Tamate et al., "Self-Healing Micellar Ion gels Based on Multiple Hydrogen Bonding," Adv. Mater. 2018, 30, 1802792 (2018).

* cited by examiner

POLYMER ELECTROLYTE AND METHOD OF PREPARING SAME

CROSS REFERENCE TO RELATED APPLICATION

The present application claims priority to and the benefit of Korean Patent Application No. 10-2020-0153296, filed on Nov. 17, 2020, the entire contents of which are incorporated herein for by reference.

FIELD

The present disclosure relates to a polymer electrolyte having high ionic conductivity and a method of preparing the same.

BACKGROUND

The statements in this section merely provide background information related to the present disclosure and may not constitute prior art.

Lithium-ion batteries are energy storage devices that have a wide range of application, from small electronic devices to electric vehicles, and have very high application potential. All parts included in the lithium-ion battery, such as cathode/anode materials, a membrane, an electrolyte and the like, may affect the performance of the lithium-ion battery, and thorough research thereon is ongoing.

Despite thorough research thereon, we have discovered that existing liquid electrolytes have disadvantages such as depletion due to leakage/side reactions, flammability, and high vapor pressure at high temperatures, and existing solid electrolytes are disadvantageous because of the excessively low ionic conductivity thereof.

Therefore, we have discovered that a polymer electrolyte that maintains a solid phase but is not volatile and has both high ionic conductivity and high stability is desired and may be utilized in lithium-ion batteries.

SUMMARY

The present disclosure provides a polymer electrolyte including a polymer matrix including a copolymer having a vinylimidazole-based repeating unit and an acrylic repeating unit and an ionic liquid, preferably a polymer electrolyte further including a metal salt.

The present disclosure provides a method of preparing a polymer electrolyte including a polymer matrix including a copolymer having a vinylimidazole-based repeating unit and an acrylic repeating unit and an ionic liquid, preferably a polymer electrolyte further including a metal salt.

One form of the present disclosure provides a polymer electrolyte, including a polymer matrix including a copolymer having a first repeating unit represented by Chemical Formula 1 and a second repeating unit represented by Chemical Formula 2 below and an ionic liquid:

[Chemical Formula 1]

[Chemical Formula 2]

$R^{11}$ may be at least one selected from the group consisting of a substituted or unsubstituted alkyl group, a substituted or unsubstituted alkoxy group, a substituted or unsubstituted $C_5$-$C_{14}$ aryl group, a substituted or unsubstituted heteroaryl group, and combinations thereof.

$R^{12}$, $R^{13}$, $R^{14}$ and $R^{15}$ may be each independently at least one selected from the group consisting of hydrogen, a halogen group, a nitrile group, a nitro group, an amine group, a substituted or unsubstituted $C_1$-$C_{10}$ alkyl group, a substituted or unsubstituted alkoxy group, a substituted or unsubstituted aryl group, a substituted or unsubstituted $C_5$-$C_{14}$ heteroaryl group, and combinations thereof.

$R^{21}$ may be selected from the group consisting of a substituted or unsubstituted $C_1$-$C_{12}$ alkyl group, a substituted or unsubstituted aryl group, a substituted or unsubstituted heteroaryl group, and combinations thereof.

$R^{22}$ may be at least one selected from the group consisting of hydrogen, a halogen group, a nitrile group, a nitro group, an amine group, a substituted or unsubstituted $C_1$-$C_{10}$ alkyl group, a substituted or unsubstituted alkoxy group, a substituted or unsubstituted aryl group, a substituted or unsubstituted heteroaryl group, and combinations thereof.

Substituents of $R^{11}$, $R^{12}$, $R^{13}$, $R^{14}$, $R^{15}$, $R^{21}$ and $R^{22}$ may be each at least one independently selected from the group consisting of a halogen group, a cyano group, a nitro group, a $C_1$-$C_3$ alkyl group, and combinations thereof.

$n^1$ and $n^2$ are each independently a molar ratio of the repeating unit, $n^1+n^2=1$, $n^1$ is a real number of 0.04 to 0.63, and $n^2$ is a real number of 0.37 to 0.96.

The copolymer may be at least one selected from the group consisting of an alternating copolymer, a block copolymer, a random copolymer, and combinations thereof.

The polymer electrolyte may include 40 to 90 wt % of the polymer matrix and 10 to 60 wt % of the ionic liquid.

The polydispersity index (PDI) of the polymer matrix may be 2.00 to 3.00.

The ionic liquid may include at least one selected from the group consisting of N-methyl-N-butyl-pyrrolidinium bis(trifluoromethylsulfonyl)imide ([$P_{14}$][TFSI]), 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI][BF4]), 1-butyl-3-methylimidazolium bis(trifluoromethylsulfonyl)imide [(BMI][TFSI]), 1-butyl-3-methylimidazolium hexafluorophosphate ([BMI][PF6]), 1-butyl-3-methylimidazolium tetrafluoroborate ([BMI][BF4]), and combinations thereof.

The polymer electrolyte may have ionic conductivity of 0.60 to 0.98 mS/cm.

The polymer electrolyte may further include a metal salt.

The amount of the metal salt may be 1.5 to 40.0 wt % based on a total of 100 wt % of the polymer electrolyte.

The metal of the metal salt may include at least one selected from the group consisting of lithium (Li), sodium (Na), potassium (K), calcium (Ca), magnesium (Mg), and combinations thereof.

The ionic conductivity of the polymer electrolyte further including the metal salt may be 0.60 to 1.50 mS/cm.

Another form of the present disclosure provides a method of preparing a polymer electrolyte, including: preparing a polymer matrix including a copolymer obtained by polymerizing a monomer represented by Chemical Formula 3 and a monomer represented by Chemical Formula 4 below:

[Chemical Formula 3]

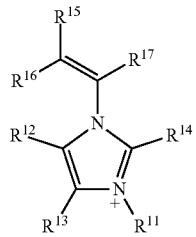

[Chemical Formula 4]

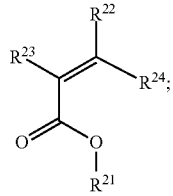

and mixing an ionic liquid with the polymer matrix to afford a polymer electrolyte.

$R^{11}$ may be at least one selected from the group consisting of a halogen group, a nitrile group, a nitro group, an amine group, a substituted or unsubstituted $C_1$-$C_{12}$ alkyl group, a substituted or unsubstituted $C_1$-$C_{10}$ alkoxy group, a substituted or unsubstituted $C_5$-$C_{14}$ aryl group, a substituted or unsubstituted heteroaryl group, and combinations thereof.

$R^{12}$, $R^{13}$, $R^{14}$, $R^{15}$, $R^{16}$ and $R^{17}$ may be each independently at least one selected from the group consisting of hydrogen, a halogen group, a nitrile group, a nitro group, an amine group, a substituted or unsubstituted $C_1$-$C_{10}$, alkyl group, a substituted or unsubstituted alkoxy group, a substituted or unsubstituted aryl group, a substituted or unsubstituted $C_5$-$C_{14}$ heteroaryl group, and combinations thereof.

$R^{21}$ may be at least one selected from the group consisting of a substituted or unsubstituted $C_1$-$C_{12}$ alkyl group, a substituted or unsubstituted aryl group, a substituted or unsubstituted heteroaryl group, and combinations thereof.

$R^{22}$, $R^{23}$ and $R^{24}$ may be each independently at least one selected from the group consisting of hydrogen, a halogen group, a nitrile group, a nitro group, an amine group, a substituted or unsubstituted $C_1$-$C_{10}$ alkyl group, a substituted or unsubstituted alkoxy group, a substituted or unsubstituted aryl group, a substituted or unsubstituted heteroaryl group, and combinations thereof.

Substituents of $R^{11}$, $R^{12}$, $R^{13}$, $R^{14}$, $R^{15}$, $R^{16}$, $R^{17}$, $R^{21}$, $R^{22}$, $R^{23}$ and $R^{24}$ are each independently at least one selected from the group consisting of a halogen group, a cyano group, a nitro group, $C_1$-$C_8$ alkyl group, and combinations thereof.

The monomer represented by Chemical Formula 3 may have a glass transition temperature (Tg) of −50 to 0° C.

The monomer represented by Chemical Formula 4 may have a glass transition temperature (Tg) of −50 to 100° C.

The method of preparing the polymer electrolyte may further include mixing a metal salt with the polymer electrolyte prepared above.

A polymer electrolyte prepared according to the present disclosure is capable of maintaining mechanical strength and exhibiting superior ionic conductivity despite the low glass transition temperature (Tg) of the monomer used to prepare the polymer matrix.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 6A:
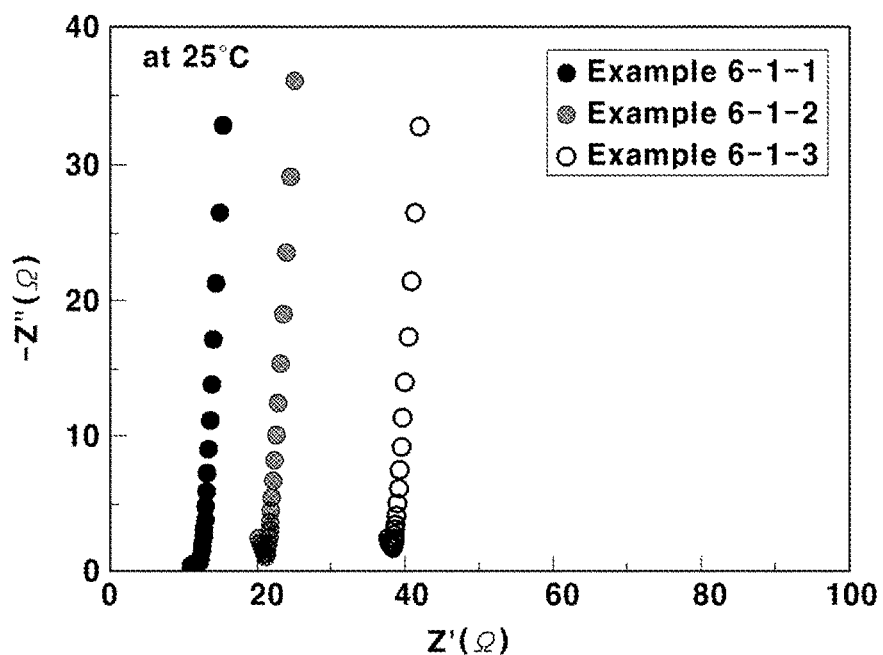
Figure 6B:
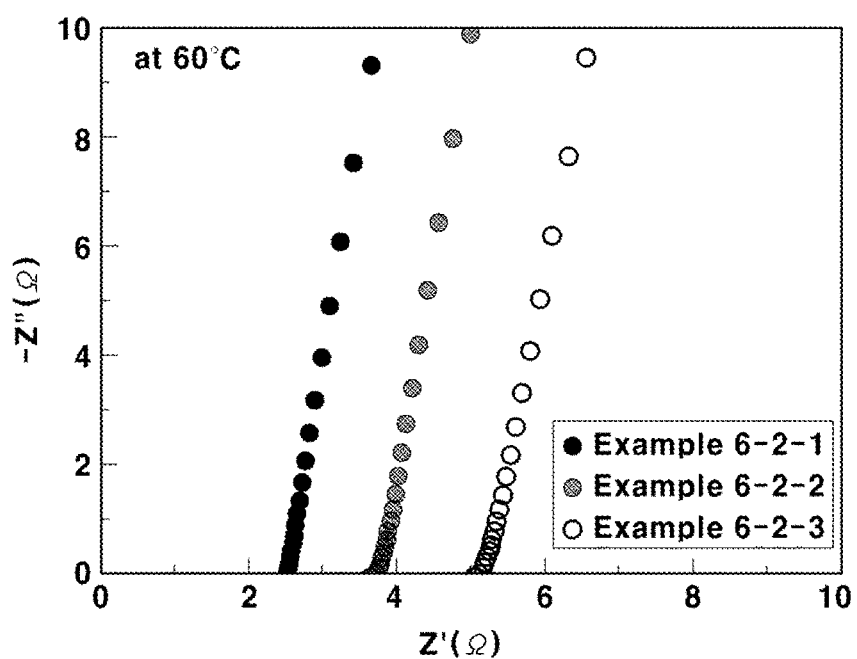
Figure 7A:
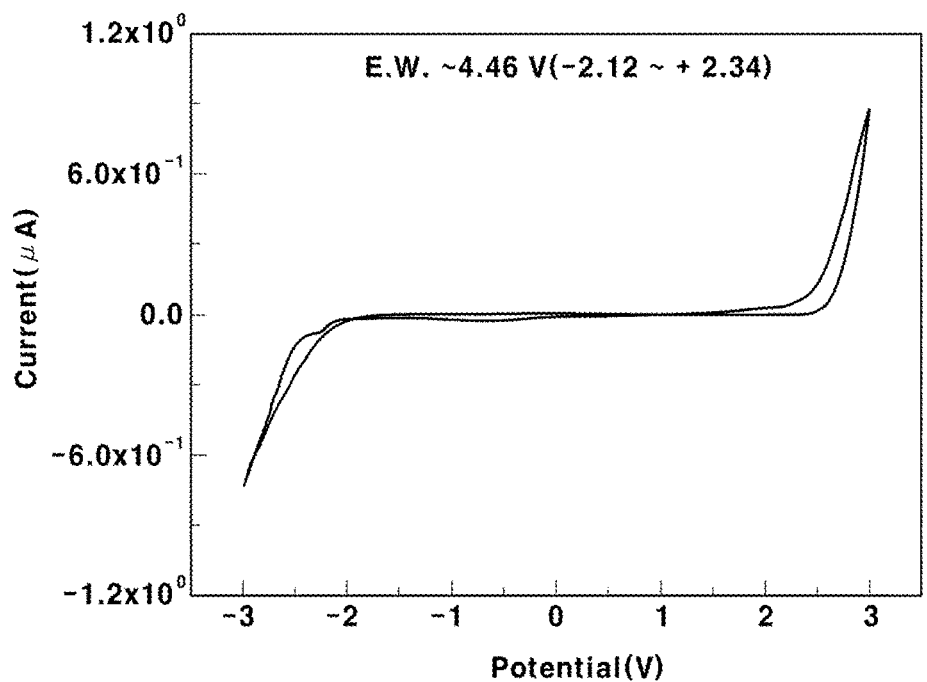
Figure 7B:
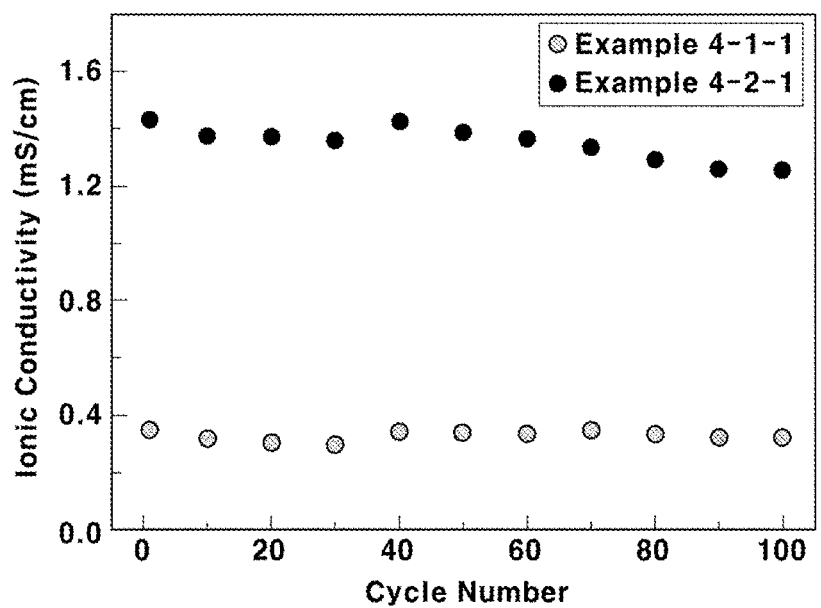

FIG. 6A is a graph showing the results of measurement of the ionic conductivity of the polymer electrolyte of each of Example 6-1-1 to Example 6-1-3, and FIG. 6B is a graph showing the results of measurement of the ionic conductivity of the polymer electrolyte of each of Example 6-2-1 to Example 6-2-3, according to the present disclosure; and FIG. 7A is a graph showing the electrochemical window of the polymer electrolyte of Example 4-2-1 according to the present disclosure, and FIG. 7B is a graph showing the results of cycle stability testing of the polymer electrolyte of each of Example 4-1-1 and Example 4-2-1 according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Unless otherwise specified herein, a "$C_1$-$C_{10}$ alkyl group" refers to a primary to tertiary alkyl group having 1 to 10 carbon atoms. The alkyl group may be, for example, a functional group such as a methyl, ethyl, n-propyl, i-propyl, n-butyl, i-butyl, Cert-butyl, or n-hexyl or the like.

Unless otherwise specified herein, a "$C_1$-$C_{10}$ alkoxy" refers to an —O—R group, in which R includes a "$C_1$-$C_{10}$ alkyl", "aryl", "heteroaryl", or "benzyl". The preferred alkoxy group includes, for example, methoxy, ethoxy, phenoxy, benzyloxy, and the like.

Unless otherwise specified herein, an aryl group refers to a chemical group obtained by removing one hydrogen atom from a $C_2$-$C_{30}$ monocyclic or polycyclic compound containing at least one benzene ring and derivatives thereof. Examples of the monocyclic or polycyclic compound containing the benzene ring may include a benzene ring, toluene or xylene in which an alkyl side chain is attached to the benzene ring, biphenyl in which two or more benzene rings are linked through a single bond, fluorene, xanthene or anthraquinone in which the benzene ring is condensed with a cycloalkyl group or a heterocycloalkyl group, naphthalene or anthracene in which two or more benzene rings are condensed, and the like.

Unless otherwise specified herein, the prefix "hetero" means that 1 to 3 hetero atoms selected from the group consisting of —N—, —O—, —S— and —P— substitute for carbon atoms. Examples thereof may include pyridine, pyrrole or carbazole, containing a nitrogen atom as a hetero atom, furan or dibenzofuran, containing an oxygen atom as a hetero atom, dibenzothiophene, diphenylamine, and the like.

Unless otherwise specified herein, a halogen group is a Group 17 element, and may be, for example, a fluoro group, a chloro group, a bromo group, or an iodo group.

Unless otherwise specified herein, the bonding lines at both ends of a Chemical Formula without any substituent indicate portions where the compound is connected to another compound.

Polymer Electrolyte

A polymer electrolyte according to one form of the present disclosure includes a polymer matrix including a copolymer having a vinylimidazole-based repeating unit and an acrylic repeating unit and an ionic liquid, and preferably further includes a metal salt.

The polymer matrix according to one form of the present disclosure includes a copolymer having a vinylimidazole-based repeating unit and an acrylic repeating unit. Preferably, the copolymer having a vinylimidazole-based repeating unit and an acrylic repeating unit may be a copolymer having a repeating unit represented by Chemical Formula 1 below and a repeating unit represented by Chemical Formula 2 below:

[Chemical Formula 1]

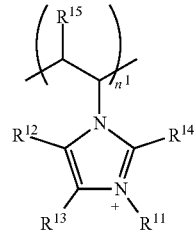

[Chemical Formula 2]

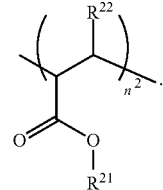

Each of $R^{11}$ and $R^{21}$ may be independently selected from the group consisting of a substituted or unsubstituted $C_1$-$C_{12}$ alkyl group, a substituted or unsubstituted alkoxy group, a substituted or unsubstituted $C_5$-$C_{14}$ aryl group, a substituted or unsubstituted heteroaryl group, and combinations thereof.

Each of $R^{12}$ to $R^{15}$ may be independently selected from the group consisting of hydrogen, a halogen group, a nitrile group, a nitro group, an amine group, a substituted or unsubstituted alkyl group, a substituted or unsubstituted alkoxy group, a substituted or unsubstituted aryl group, a substituted or unsubstituted $C_5$-$C_{14}$ heteroaryl group, and combinations thereof.

$R^{22}$ may be selected from the group consisting of hydrogen, a halogen group, a nitrile group, a nitro group, an amine group, a substituted or unsubstituted $C_1$-$C_{10}$ alkyl group, a substituted or unsubstituted alkoxy group, a substituted or unsubstituted aryl group, a substituted or unsubstituted heteroaryl group, and combinations thereof.

Each of substituents of $R^{11}$ to $R^{22}$ may be independently any one selected from the group consisting of a halogen group, a hydroxy group, a carboxyl group, a cyano group, a nitro group, an amino group, a thio group, a methylthio group, an alkoxy group, a nitrile group, an aldehyde group, an epoxy group, an ether group, an ester group, a carbonyl group, an acetal group, a ketone group, an alkyl group, a perfluoroalkyl group, a cycloalkyl group, a heterocycloalkyl group, a benzyl group, an aryl group, a heteroaryl group, derivatives thereof, and combinations thereof, each of which substitutes for hydrogen. Preferably, each substituent is a halogen group, a cyano group, a nitro group, or a $C_1$-$C_8$ alkyl group.

Also, $n^1$ and $n^2$ are a molar ratio of the repeating unit represented by Chemical Formula 1 and a molar ratio of the repeating unit represented by Chemical Formula 2, respectively, $n^1+n^2=1$, $n^1$ is a real number from 0.04 to 0.63, and $n^2$ is a real number from 0.37 to 0.96, and preferably, $n^1$ is a real number from 0.047 to 0.62 and $n^2$ is a real number from 0.38 to 0.953. If $n^1$ is less than 0.04 or $n^2$ exceeds 0.96, the amount of the ionic domain may decrease and thus ionic conductivity may be lowered. On the other hand, if $n^1$ exceeds 0.63 or $n^2$ is less than 0.37, the polymer electrolyte may not be formed, or may be non-uniform.

The copolymer that is contained in the polymer matrix according to one form of the present disclosure may be a random copolymer in which the repeating unit represented by Chemical Formula 1 and the repeating unit represented by Chemical Formula 2 are randomly connected, a block copolymer composed of blocks having repeating units represented by Chemical Formula 1 and blocks having repeating units represented by Chemical Formula 2, or an alternating copolymer in which the repeating unit represented by Chemical Formula 1 and the repeating unit represented by Chemical Formula 2 are alternately connected, and is preferably a random copolymer in which the repeating units represented by Chemical Formula 1 and Chemical Formula 2 are randomly arranged.

As used herein, the term "random copolymer" is not an alternating copolymer in which different monomers are regularly and alternately arranged, but is a copolymer in which different monomers are distributed randomly along the chain without regularity.

The polydispersity index (PDI) of the polymer matrix according to one form of the present disclosure may be 2.00 to 3.00. As used herein, the term "polydispersity index" is the ratio of the weight average molecular weight relative to the number average molecular weight. If the PDI of the polymer matrix exceeds 3.00, a uniform polymer gel electrolyte cannot be formed.

Accordingly, the weight average molecular weight ($M_w$) of the polymer matrix may be 100,000 to 200,000 g/mol, and the number average molecular weight ($M_n$) thereof may be 25,000 to 55,000 g/mol. If the weight average molecular weight of the polymer matrix is less than 100,000 g/mol, mechanical strength is low, whereas if it exceeds 200,000 g/mol, a uniform gel electrolyte cannot be formed. Also, if the number average molecular weight of the polymer matrix is less than 25,000 g/mol, mechanical strength is low, whereas if it exceeds 55,000 g/mol, a uniform gel electrolyte cannot be formed.

The polymer matrix according to the present disclosure is characterized in that the solubility of the polymer electrolyte prepared including the same in an ionic liquid may be maintained by appropriately adjusting the ratio of the repeating units constituting the random copolymer and the weight average molecular weight thereof.

An ionic liquid according to one form of the present disclosure is an ionic compound that is a liquid at a temperature of 100° C. or less. More generally, the ionic liquid may be a salt having a melting point lower than or equal to room temperature (20° C. to 25° C.) The ionic liquid according to the present disclosure is not particularly limited, so long as it is able to increase the ionic conductivity of the polymer electrolyte prepared therefrom.

The ionic liquid according to one form of the present disclosure may include at least one selected from the group consisting of N-methyl-N-butyl-pyrrolidinium bis(trifluoromethylsulfonyl)imide ([$P_{14}$][TFSI]), 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI][BF4]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]), and combinations thereof, and preferably includes N-methyl-N-butyl-pyrrolidinium bis(trifluoromethylsulfonyl)imide ([$P_{14}$][TFSI]) having a wide electrochemical window.

The polymer electrolyte according to one form of the present disclosure may include 40 to 90 mol % of the polymer matrix and 10 to 60 mol % of the ionic liquid. If the amount of the polymer matrix is less than 40 wt %, the durability of the gel electrolyte may be lowered due to the decreased mechanical strength. On the other hand, if the amount thereof exceeds 90 wt %, ionic conductivity may be lowered. Also, if the amount of the ionic liquid is less than 10 wt %, ionic conductivity may be lowered. On the other hand, if the amount thereof exceeds 60 wt %, mechanical strength may decrease.

Thus, the polymer electrolyte prepared according to the present disclosure is configured such that the polymer matrix including the random copolymer and the ionic liquid are homogeneously mixed, and has ionic conductivity of 0.60 to 0.98 mS/cm, indicating superior ionic conductivity. The polymer electrolyte may further include a metal salt, as will be described later, thereby increasing ionic conductivity.

The polymer electrolyte according to one form of the present disclosure may further include a metal salt, in addition to the polymer matrix and the ionic liquid.

The metal contained in the metal salt according to one form of the present disclosure may include at least one selected from the group consisting of lithium (Li), sodium (Na), potassium (K), calcium (Ca), magnesium (Mg), and combinations thereof. Thus, it is preferable that the metal salt according to one form of the present disclosure include [Li][TFSI], suitable for use in batteries, because the anion is the same as EMI TFSI and the size of Li ions is small.

The polymer electrolyte according to the present disclosure may include 1.5 to 40.0 wt % of the metal salt based on a total of 100 wt % of the polymer electrolyte. If the amount of the metal salt exceeds 40.0 wt %, Li ions may precipitate, and it may be difficult to form a uniform gel.

The polymer electrolyte according to the present disclosure includes the polymer matrix including the random copolymer and the ionic liquid, which are uniformly mixed together, and further includes the metal salt, so the ionic conductivity thereof is 0.60 to 1.50 mS/cm, showing that the ionic conductivity is further increased compared to existing technology.

Method of Preparing Polymer Electrolyte

Figure 1:
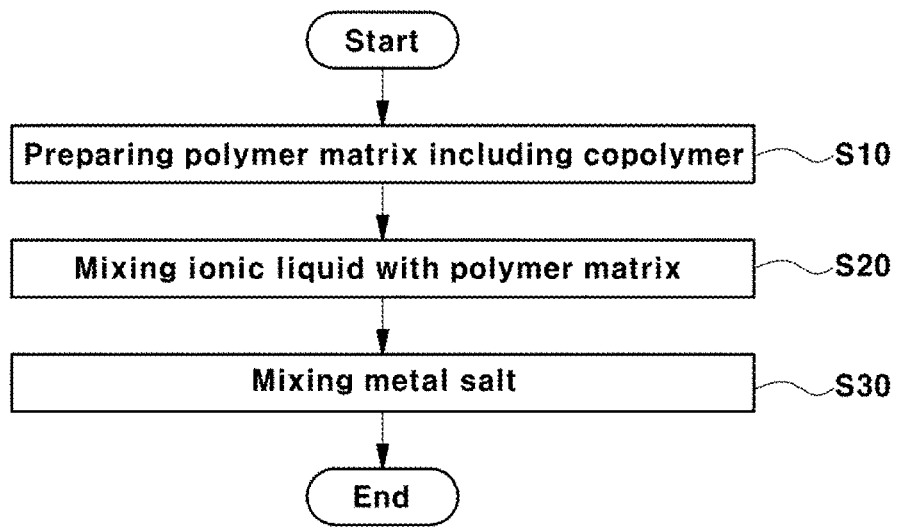
FIG. 1 is a flowchart showing a process of preparing a polymer electrolyte according to one form of the present disclosure.

FIG. 1 is a flowchart showing the process of preparing a polymer electrolyte according to the present disclosure. With reference thereto, the method may include preparing a polymer matrix including a copolymer (S10) and mixing an ionic liquid with the polymer matrix (S20), and may further include mixing a metal salt (S30).

Preparing the polymer matrix (S10) is a step of preparing a polymer matrix including a copolymer obtained by polymerizing a monomer represented by Chemical Formula 3 below and a monomer represented by Chemical Formula 4 below:

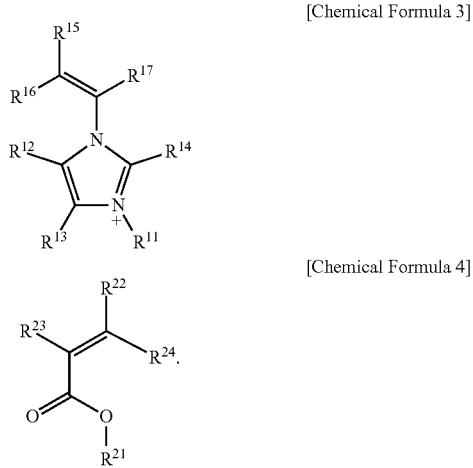

[Chemical Formula 3]

[Chemical Formula 4]

Here, $R^{11}$ to $R^{15}$ and $R^{21}$ and $R^{22}$ may be the same as or different from those described in the polymer matrix, $R^{16}$ and $R^{17}$ may be the same as or different from $R^{12}$, and $R^{23}$ and $R^{24}$ may be the same as or different from $R^{22}$.

According to the present disclosure, the monomer represented by Chemical Formula 3 may have a glass transition temperature (Tg) of −50 to 0° C. If the glass transition temperature thereof is lower than −50° C., mechanical strength may decrease, whereas if it exceeds 0° C., ionic conductivity may be lowered due to a decrease in chain mobility.

Also, the monomer represented by Chemical Formula 4 may have a glass transition temperature (Tg) of −50 to 100° C. If the glass transition temperature thereof is lower than −50° C., mechanical strength may decrease, whereas if it exceeds 100° C., ionic conductivity may be lowered due to a decrease in chain mobility. Specifically, the present disclosure is intended to prepare a polymer electrolyte from monomers having glass transition temperatures within ranges appropriate for improving the chain mobility and the ionic conductivity of the ionic liquid, and is thus characterized by having superior ionic conductivity compared to polymer electrolytes manufactured using existing technology.

Examples of methods for polymerization of the copolymer according to the present disclosure may include free-radical polymerization, living anionic polymerization, living cationic polymerization, controlled radical polymerization, RAFT (reversible addition-fragmentation chain transfer), ATRP (atom transfer radical polymerization), NMP (nitroxide-mediated polymerization), and the like. Preferable is free-radical polymerization, in which the reaction is easy and simple. In the case of polymerization using the free-radical polymerization process, the monomers and azobisisobutyronitrile (AIBN) may be mixed, purged with Ar gas at room temperature for 30 minutes to 1.5 hours, and then polymerized at a temperature of 78° C. to 82° C. After polymerization, the solution may be optionally quenched with liquid nitrogen and precipitated in excess methanol to obtain a polymer, which may then be filtered and dried under reduced pressure at 30° C. to 70° C. for purification. This process may be repeated 2 to 5 times for further purification.

The polymer matrix prepared through the above method may be provided in at least one form selected from the group consisting of an alternating copolymer, a block copolymer, a random copolymer, and combinations thereof, and is preferably a random copolymer.

Since the step of preparing the polymer matrix including the random copolymer according to the present disclosure does not include the addition of an additional functional group, the polymer matrix may be prepared simply and effectively, so the processing step is simple and the processing efficiency and economy are excellent.

In the steps of mixing the ionic liquid (S20) and mixing the metal salt (S30), the ionic liquid and also the metal salt are mixed with the polymer matrix prepared above. Here, the mixing process may be performed through a typical process of uniformly dispersing the polymer matrix and/or the metal salt in the ionic liquid, for example, stirring at room temperature using a magnetic bar. The ionic liquid and the metal salt to be mixed may be the same as or different from those described above.

A better understanding of the present disclosure will be given through the following examples, which are merely set forth to illustrate the present disclosure and are not to be construed as limiting the scope of the present disclosure.

Example 1: Polymer Electrolyte not Including Metal Salt (S10) A polymer matrix, poly(1-butyl-3-vinylimidazole-ran-butyl acrylate)(TFSI) [PBVI-ran-BA][TFSI]], was synthesized through free-radical polymerization (Scheme 1 below):

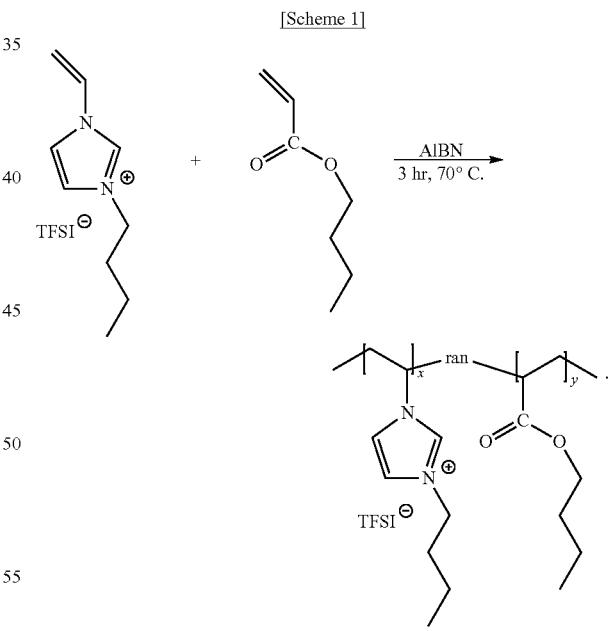

[Scheme 1]

Specifically, in order to prepare 1-butyl-3-vinylimidazole, 1-vinylimidazole (20 g, 0.1063 mol) and 1-bromobutane (29.13 g, 0.2123 mol) were dissolved in DCM (30 mL), and a reflux reaction was then carried out for 24 hours. The reaction solution was added with a solution of [Li][TFSI] (57.42 g, 0.2 mol) dissolved in 20 ml of water and then stirred. After 3 hours, the solution dissolved in DCM was extracted through fractional distillation, thus obtaining 1-butyl-3-vinylimidazole.

Subsequently, the 1-butyl-3-vinylimidazole prepared above and butyl acrylate were passed through a column packed with basic alumina. Thereafter, 1-butyl-3-vinylimidazole (27.86 g, 120.5 mmol), butyl acrylate (0.312 g, 2.4356 mmol), AIBN (0.01 g, 0.06089 mmol), and 20 mL of chloroform were placed in a flask equipped with a magnetic stirring bar. The reaction mixture was purged with argon gas at room temperature for 1 hour and then allowed to react at 70° C. After 3 hours, the solution was quenched with liquid nitrogen. The reaction product was precipitated in excess methanol to afford [PBVI-ran-BA][TFSI], which was then filtered and dried under reduced pressure at 60° C. This process was repeated 3 times for further purification. The number average molecular weight ($M_n$) and the weight average molecular weight ($M_w$) of the polymer matrix, measured through size exclusion chromatography (SEC) calibrated with PS standards, were 52,000 g/mol and 81,600, respectively, the polydispersity index (PDI) thereof was 1.57, and the mol % of the BVI (polymer matrix) contained in [PBVI-ran-BA][TFSI] was 61.9 mol %.

(S20) N-methyl-N-butyl-pyrrolidinium bis(trifluoromethylsulfonyl)imide ([$P_{14}$][TFSI]) as an ionic liquid was mixed therewith, thereby preparing a polymer electrolyte including 20 wt % of the polymer matrix and 80 wt % of the ionic liquid.

Example 2: Polymer Electrolyte not Including Metal Salt

A polymer electrolyte was prepared in the same manner as in Example 1, with the exception that a polymer matrix prepared by adding 1-butyl-3-vinylimidazole (22.0 g, 95.18 mmol) and butyl acrylate (0.10 g, 0.85 mmol) and having a number average molecular weight (MO of 45,000 g/mol, a weight average molecular weight ($M_w$) of 112,000 g/mol, and a polydispersity index (PDI) of 2.47, in which the mol % of BVI (polymer matrix) contained in [PBVI-ran-BA][TFSI] was 4.76 mol %, was mixed with [$P_{14}$][TFSI] as an ionic liquid, thereby preparing a polymer electrolyte including 20 wt % of the polymer matrix and 80 wt % of the ionic liquid, in contrast to Example 1.

Example 3: Polymer Electrolyte not Including Metal Salt

A polymer electrolyte was prepared in the same manner as in Example 1, with the exception that a polymer matrix prepared by adding 1-butyl-3-vinylimidazole (21.0 g, 90.86 mmol) and butyl acrylate (1.29 g, 10.1 mmol) and having a number average molecular weight ($M_n$) of 30,000 g/mol, a weight average molecular weight ($M_w$) of 39,000 g/mol, and a polydispersity index (PDI) of 1.30, in which the mol % of the BVI (polymer matrix) contained in [PBVI-ran-BA][TFSI] was 51.8 mol %, was mixed with [$P_{14}$][TFSI] as an ionic liquid, thereby preparing a polymer electrolyte including 20 wt % of the polymer matrix and 80 wt % of the ionic liquid, in contrast to Example 1.

Example 4-1-1 to Example 4-2-3: Polymer Electrolyte Including Metal Salt ([Li][TFSI])

Respective polymer electrolytes were prepared in the same manner as in Example 1, with the exception that the polymer electrolyte was prepared using 20 wt % of a metal salt (Example 4-1-1), 30 wt % of a metal salt (Example 4-1-2), and 40 wt % of a metal salt (Example 4-1-3), based on a total of 100 wt % of the polymer electrolyte, at 25° C.; and the polymer electrolyte was prepared using 20 wt % of a metal salt (Example 4-2-1), 30 wt % of a metal salt (Example 4-2-2), and 40 wt % of a metal salt (Example 4-2-3), based on a total of 100 wt % of the polymer electrolyte, at 60° C., in contrast with Example 1.

Example 5-1-1 to Example 5-2-3: Polymer Electrolyte Including Metal Salt ([Li][TFSI])

Respective polymer electrolytes were prepared in the same manner as in Example 2, with the exception that the polymer electrolyte was prepared using 20 wt % of a metal salt (Example 5-1-1), 30 wt % of a metal salt (Example 5-1-2), and 40 wt % of a metal salt (Example 5-1-3), based on a total of 100 wt % of the polymer electrolyte, at 25° C.; and the polymer electrolyte was prepared using 20 wt % of a metal salt (Example 5-2-1), 30 wt % of a metal salt (Example 5-2-2), and 40 wt % of a metal salt (Example 5-2-3), based on a total of 100 wt % of the polymer electrolyte, at 60° C., in contrast to Example 2.

Example 6-1-1 to Example 6-2-3: Polymer Electrolyte Including Metal Salt ([Li][TFSI])

Respective polymer electrolytes were prepared in the same manner as in Example 3, with the exception that the polymer electrolyte was prepared using 20 wt % of a metal salt (Example 6-1-1), 30 wt % of a metal salt (Example 6-1-2), and 40 wt % of a metal salt (Example 6-1-3), based on a total of 100 wt % of the polymer electrolyte, at 25° C.; and the polymer electrolyte was prepared using 20 wt % of a metal salt (Example 6-2-1), 30 wt % of a metal salt (Example 6-2-2), and 40 wt % of a metal salt (Example 6-2-3), based on a total of 100 wt % of the polymer electrolyte, at 60° C., in contrast to Example 3.

Test Example 1: Confirmation of Structure of Prepared Polymer Matrix

Figure 2:
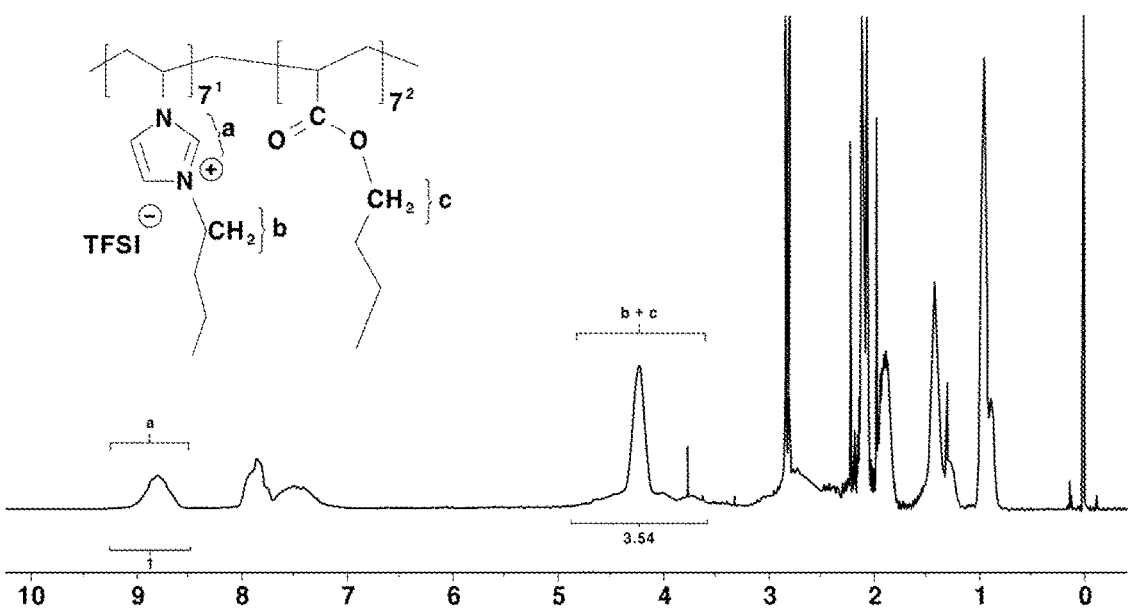
FIG. 2 is a graph showing a $^1$H NMR spectrum of poly(1-butyl-3-vinyl imidazole-ran-butyl acrylate) (TFSI) [PBVI-ran-BA][TFSI]], which is a polymer matrix contained in the polymer electrolyte prepared according to one form of the present disclosure.

Based on the $^1$H NMR spectrum shown in FIG. 2, it was confirmed that the random copolymer was successfully synthesized. Specifically, as shown in FIG. 2, hydrogen bonded to carbon between nitrogen atoms in the imidazole system was observed through the peak location and peak area of the region a, hydrogen of the methyl group ($CH_2$) stripped due to the adjacent nitrogen was observed through the peak location and peak area of the region b, and hydrogen of the methyl group ($CH_2$) stripped due to the adjacent carbonyl group and oxygen was observed through the peak location and peak area of the region c, indicating that the poly(1-butyl-3-vinylimidazole-ran-butyl acrylate) (TFSI) [PBVI-ran-BA][TFSI]] according to the present disclosure was successfully synthesized.

Test Example 2: Measurement of Electrochemical Impedance Spectroscopy (EIS) of Polymer Electrolyte not Including Metal Salt The polymer electrolyte of each of Example 1 to Example 3 was prepared, and 12 wt % of acetone based on the weight of the polymer matrix was added to form a membrane having a thickness of 0.04 mm and a diameter of 18 mm, and the EIS thereof was measured. The results thereof are shown in FIGS. 3A to 3C.

Figure 3A:
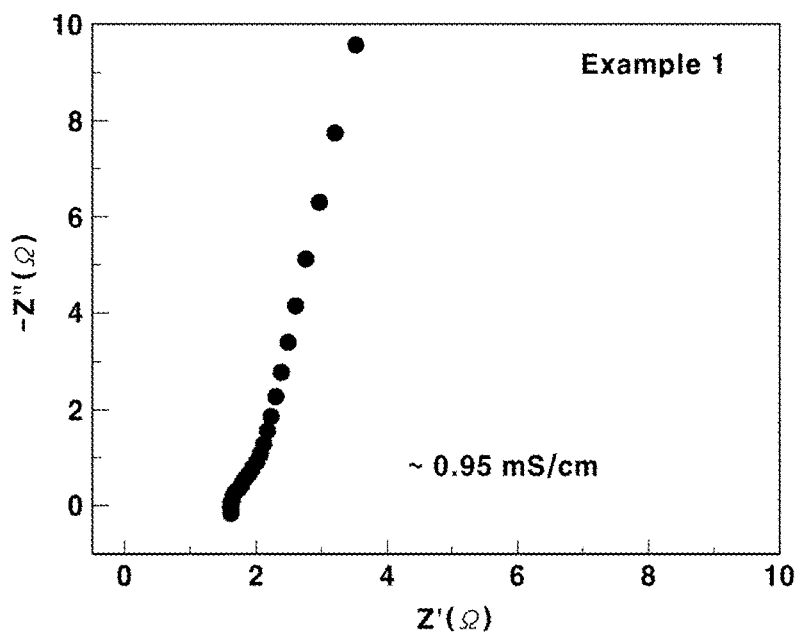
FIGS. 3A, 3B and 3C are graphs showing the results of electrochemical impedance spectroscopy (EIS) performed on the polymer electrolytes of Example 1 (FIG. 3A), Example 2 (FIG. 3B), and Example 3 (FIG. 3C) according to the present disclosure.
Figure 3B:
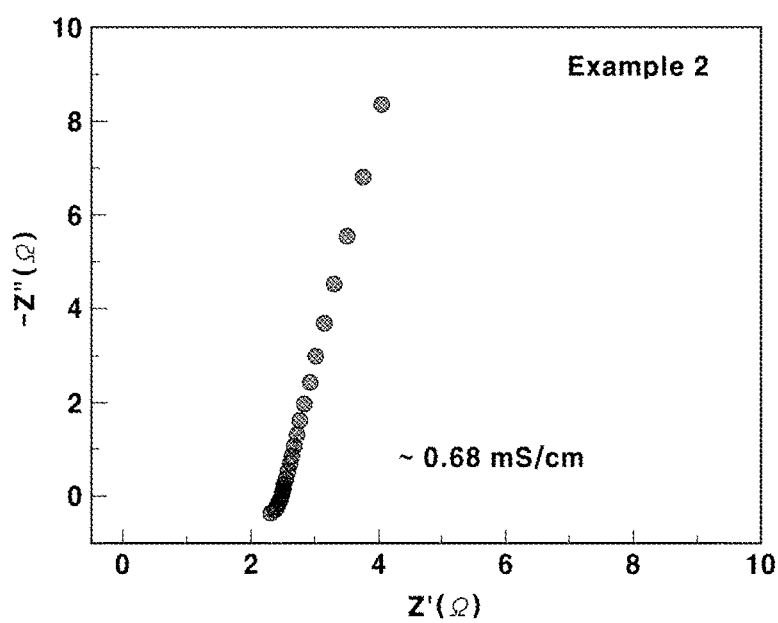
Figure 3C:
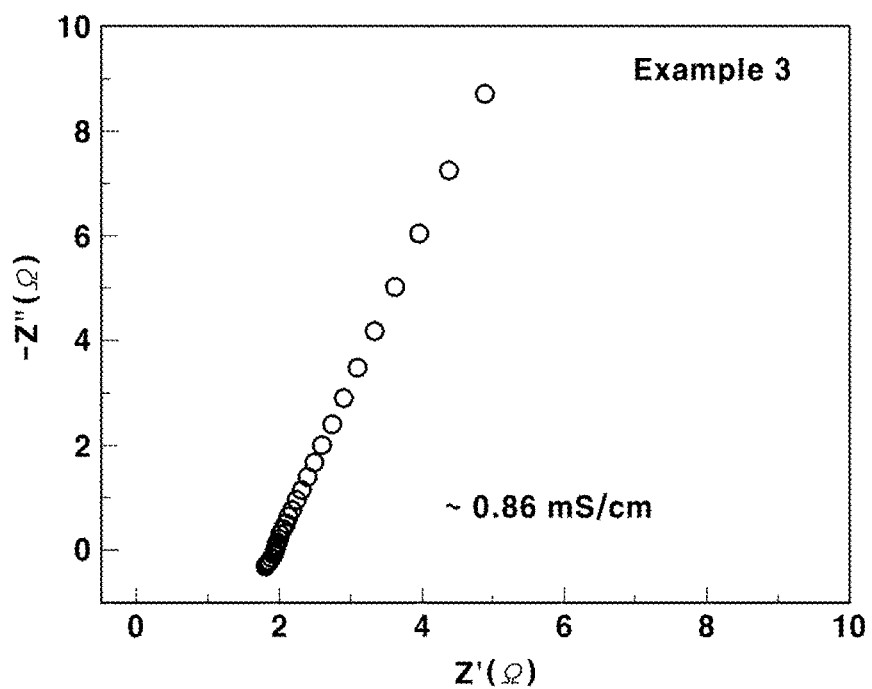
Figure 4A:
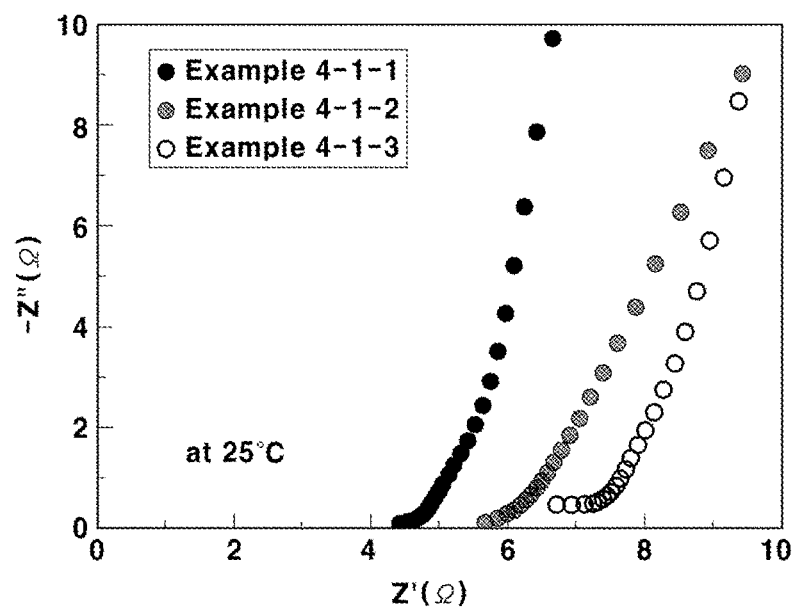
FIG. 4A is a graph showing the results of measurement of the ionic conductivity of the polymer electrolyte of each of Example 4-1-1 to Example 4-1-3.
Figure 4B:
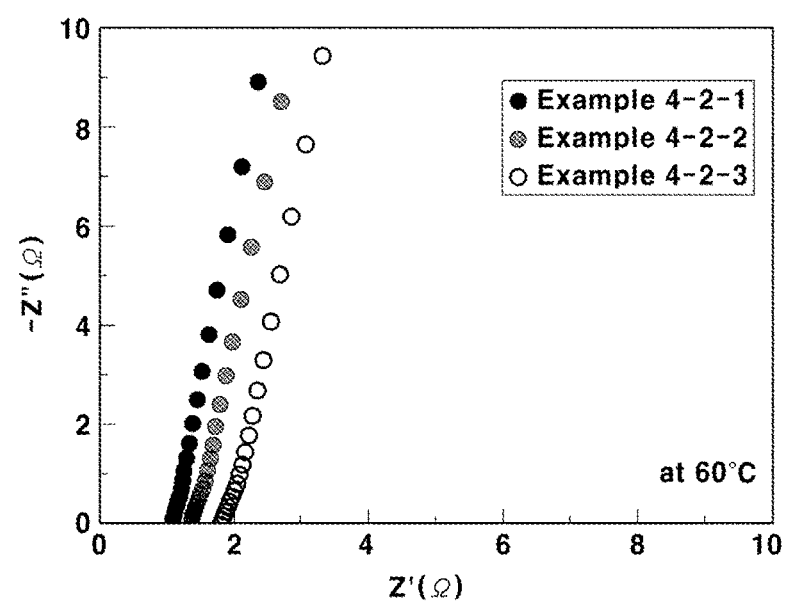
FIG. 4B is a graph showing the results of measurement of the ionic conductivity of the polymer electrolyte of each of Example 4-2-1 to Example 4-2-3, according to the present disclosure.
Figure 5A:
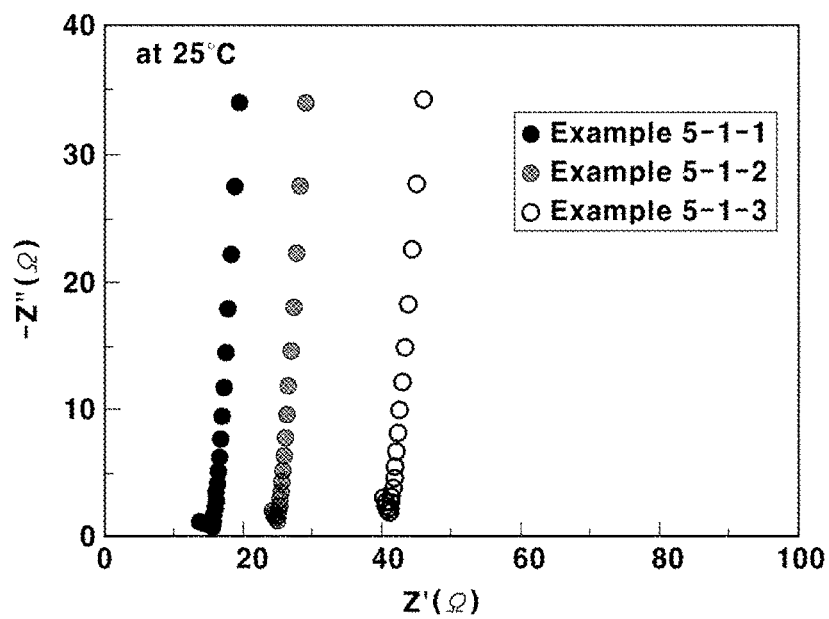
FIG. 5A is a graph showing the results of measurement of the ionic conductivity of the polymer electrolyte of each of Example 5-1-1 to Example 5-1-3.
Figure 5B:
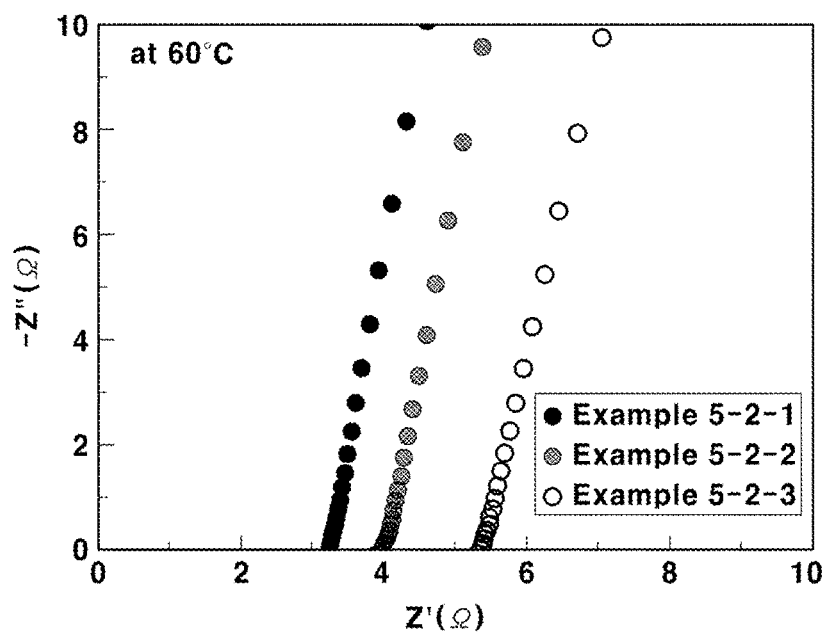
FIG. 5B is a graph showing the results of measurement of the ionic conductivity of the polymer electrolyte of each of Example 5-2-1 to Example 5-2-3, according to the present disclosure.

With reference to FIGS. 3A to 3C, the polymer electrolyte of Example 1, in which the amount of 1-butyl-3-vinylimidazole (BVI) was relatively high, exhibited the highest ionic conductivity while maintaining mechanical strength because there was little downward flow.

Test Example 3: Measurement of Ionic Conductivity of Polymer Electrolyte Including Metal Salt The polymer electrolyte of each of Example 4-1-1 to Example 6-2-3 was prepared using the metal salt at different concentrations depending on the temperature, after which the ionic conductivity thereof was measured. The results thereof are shown in Tables 1 to 3 below and in FIGS. 4A and 4B to 6A and 6B.

TABLE 1

| Ionic salt | Ionic conductivity (mS/cm) | | |
|---|---|---|---|
| | 20 wt % | 30 wt % | 40 wt % |
| 25° C. | 0.35 (Example 4-1-1) | 0.30 (Example 4-1-2) | 0.23 (Example 4-1-3) |
| 60° C. | 1.43 (Example 4-2-1) | 1.14 (Example 4-2-2) | 0.90 (Example 4-2-3) |

TABLE 2

| Ionic salt | Ionic conductivity (mS/cm) | | |
|---|---|---|---|
| | 20 wt % | 30 wt % | 40 wt % |
| 25° C. | 0.23 (Example 5-1-1) | 0.14 (Example 5-1-2) | 0.09 (Example 5-1-3) |
| 60° C. | 1.10 (Example 5-2-1) | 0.89 (Example 5-2-2) | 0.66 (Example 5-2-3) |

TABLE 3

| Ionic salt | Ionic conductivity (mS/cm) | | |
|---|---|---|---|
| | 20 wt % | 30 wt % | 40 wt % |
| 25° C. | 0.31 (Example 6-1-1) | 0.17 (Example 6-1-2) | 0.09 (Example 6-1-3) |
| 60° C. | 1.40 (Example 6-2-1) | 0.95 (Example 6-2-2) | 0.69 (Example 6-2-3) |

With reference to Tables 1 to 3 and FIGS. 4A and 4B to 6A and 6B, the higher the temperature and the lower the concentration of the ionic salt, the higher the ionic conductivity. In particular, the polymer electrolyte of Example 4-2-1, in which the amount of 1-butyl-3-vinylimidazole (BVI) was relatively high, exhibited the highest ionic conductivity.

Test Example 4: Measurement of Electrochemical Window and Cycle Stability Test of Polymer Electrolyte Including Metal Salt The electrochemical window of the polymer electrolyte of Example 4-2-1 was measured, and a cycle stability test was performed on the polymer electrolyte of each of Example 4-1-1 and Example 4-2-1. The results thereof are shown in FIGS. 7A and 7B.

With reference to FIG. 7A, the electrochemical window of the polymer electrolyte of Example 4-2-1 was about 4.46 V, ranging from −2.12 V to 2.34 V, indicating a wide electrochemical window.

With reference to FIG. 7B, in Example 4-1-1 and Example 4-2-1, even when the metal salt was included in the state in which there was a great difference in temperature, the change in ionic conductivity depending on a change in the temperature during 100 cycles was less than 13%. According to one form of the present disclosure, the polymer electrolyte including the metal salt exhibited high cycle stability even upon a temperature change.

Therefore, it can be confirmed that the polymer electrolyte according to the present disclosure is a system capable of controlling ionic conductivity, which is an ionic chemical property, by adjusting the amount of each of the polymer matrix, ionic liquid, and metal salt and the temperature.

What is claimed is:

1. A polymer electrolyte, comprising:
   an ionic liquid; and
   a polymer matrix comprising a copolymer having a first repeating unit represented by Chemical Formula 1 and a second repeating unit represented by Chemical Formula 2 below:

[Chemical Formula 1]

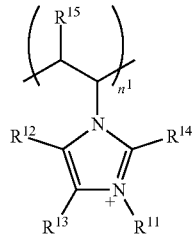

[Chemical Formula 2]

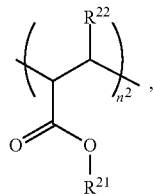

wherein: $R^{11}$ is at least one selected from the group consisting of a substituted or unsubstituted $C_1$-$C_{12}$ alkyl group, a substituted or unsubstituted $C_1$-$C_{10}$ alkoxy group, a substituted or unsubstituted $C_5$-$C_{14}$ aryl group, a substituted or unsubstituted heteroaryl group, and combinations thereof, $R^{12}$, $R^{13}$, $R^{14}$, and $R^{15}$ are each independently at least one selected from the group consisting of hydrogen, a halogen group, a nitrile group, a nitro group, an amine group, a substituted or unsubstituted $C_1$-$C_{10}$ alkyl group, a substituted or unsubstituted alkoxy group, a substituted or unsubstituted aryl group, a substituted or unsubstituted $C_5$-$C_{14}$ heteroaryl group, and combinations thereof, $R^{21}$ is at least one selected from the group consisting of a substituted or unsubstituted $C_1$-$C_{12}$ alkyl group, a substituted or unsubstituted aryl group, a substituted or unsubstituted heteroaryl group, and combinations thereof, $R^{22}$ is at least one selected from the group consisting of hydrogen, a halogen group, a nitrile group, a nitro group, an amine group, a substituted or unsubstituted $C_1$-$C_{10}$ alkyl group, a substituted or unsubstituted alkoxy group, a substituted or unsubstituted aryl group, a substituted or unsubstituted heteroaryl group, and combinations thereof, substituents of $R^{11}$, $R^{12}$, $R^{13}$, $R^{14}$, $R^{15}$, $R^{21}$ and $R^{22}$ are each independently at least one selected from the group consisting of a halogen group, a cyano group, a nitro group, a $C_1$-$C_8$ alkyl group, and combinations thereof, and $n^1$ and $n^2$ are each independently a molar ratio of the repeating unit, wherein $n^1+n^2=1$, $n^1$ is a real number of 0.04 to 0.63, and $n^2$ is a real number of 0.37 to 0.96.

2. The polymer electrolyte of claim 1, wherein the copolymer is at least one selected from the group consisting of an alternating copolymer, a block copolymer, a random copolymer, and combinations thereof.

3. The polymer electrolyte of claim 1, comprising:
40 to 90 wt % of the polymer matrix; and
10 to 60 wt % of the ionic liquid.

4. The polymer electrolyte of claim 1, wherein a polydispersity index (PDI) of the polymer matrix is 2.00 to 3.00.

5. The polymer electrolyte of claim 1, wherein the ionic liquid comprises at least one selected from the group consisting of N-methyl-N-butyl-pyrrolidinium bis(trifluoromethylsulfonyl)imide ([P$_{14}$][TFSI]), 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI][BF4]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]), and combinations thereof.

6. The polymer electrolyte of claim 1, having an ionic conductivity of 0.60 to 0.98 mS/cm.

7. The polymer electrolyte of claim 1, further comprising a metal salt.

8. The polymer electrolyte of claim 7, wherein an amount of the metal salt is 1.5 to 40.0 wt % based on a total of 100 wt % of the polymer electrolyte.

9. The polymer electrolyte of claim 7, wherein a metal of the metal salt comprises at least one selected from the group consisting of lithium (Li), sodium (Na), potassium (K), calcium (Ca), magnesium (Mg), and combinations thereof.

10. The polymer electrolyte of claim 7, wherein an ionic conductivity of the polymer electrolyte is 0.60 to 1.50 mS/cm.

11. A method of preparing a polymer electrolyte, the method comprising:
preparing a polymer matrix comprising a copolymer obtained by polymerizing a monomer represented by Chemical Formula 3 and a monomer represented by Chemical Formula 4 below:

[Chemical Formula 3]

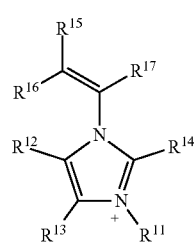

[Chemical Formula 4]

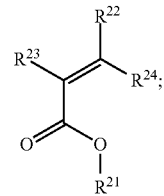

and mixing an ionic liquid with the polymer matrix, wherein: $R^{11}$ is at least one selected from the group consisting of a halogen group, a nitrile group, a nitro group, an amine group, a substituted or unsubstituted $C_1$-$C_{12}$ alkyl group, a substituted or unsubstituted $C_1$-$C_{10}$ alkoxy group, a substituted or unsubstituted $C_5$-$C_{14}$ aryl group, a substituted or unsubstituted heteroaryl group, and combinations thereof, $R^{12}$, $R^{13}$, $R^{14}$, $R^{15}$, $R^{16}$ and $R^{17}$ are each independently at least one selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted $C_5$-$C_{14}$ heteroaryl group, and combinations thereof, $R^{21}$ is at least one selected from the group consisting of a substituted or unsubstituted $C_1$-$C_{12}$ alkyl group, a substituted or unsubstituted aryl group, a substituted or unsubstituted heteroaryl group, and combinations thereof, $R^{22}$, $R^{23}$ and $R^{24}$ are each independently at least one selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group, and combinations thereof, and substituents of $R^{11}$, $R^{12}$, $R^{13}$, $R^{14}$, $R^{15}$, $R^{16}$, $R^{17}$, $R^{21}$, $R^{22}$, $R^{23}$ and $R^{24}$ are each independently at least one selected from the group consisting of a halogen group, a cyano group, a nitro group, a $C_1$-$C_3$ alkyl group, and combinations thereof.

12. The method of claim 11, wherein the copolymer is at least one selected from the group consisting of an alternating copolymer, a block copolymer, a random copolymer, and combinations thereof.

13. The method of claim 11, wherein the monomer represented by Chemical Formula 3 has a glass transition temperature (Tg) of −50 to 0° C.

14. The method of claim 11, wherein the monomer represented by Chemical Formula 4 has a glass transition temperature (Tg) of −50 to 100° C.

15. The method of claim 11, wherein the ionic liquid comprises at least one selected from the group consisting of N-methyl-N-butyl-pyrrolidinium bis(trifluoromethylsulfonyl)imide ([P$_{14}$][TFSI]), 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI][BF4]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]), or combinations thereof.

16. The method of claim 11, further comprising mixing a metal salt with the polymer electrolyte.

17. The method of claim 16, wherein a metal of the metal salt comprises at least one selected from the group consisting of lithium (Li), sodium (Na), potassium (K), calcium (Ca), magnesium (Mg), and combinations thereof.

* * * * *